Patented Mar. 17, 1953

2,631,940

UNITED STATES PATENT OFFICE 2,631,940

CERAMIC COMPOSITION

Harry C. Dunegan, Garden City, N. Y., assignor to the United States of America as represented by the Secretary of the Air Force No Drawing. Application October 25, 1951,
Serial No. 253,226

3 Claims. (Cl. 106—46)

The invention described herein may be manufactured and used by or for the Government for governmental purposes without payment to me of any royalty thereon.

This invention relates to compositions of matter, and has reference more particularly to ceramic compositions that may be fabricated by casting in plaster molds, or by other methods common to the ceramic industries; and which have high fired strength and electrical characteristics suitable for the body of or the protective skins on sandwich-type ceramic radomes, or other applications. A radome is a protective dome or a covering for a radiating and receiving system commonly operating at radar frequencies and transparent to electromagnetic radiation at those particular frequencies.

High strength plastic radomes employed in present aircraft installations are not adequate for long-range guided missile applications. Present requirements include excellent thermal stability at elevated temperatures, which the conventional plastics cannot meet. A solid ceramic composition or a sandwich structure, consisting of a light-weight porous ceramic body, for example, a sintered diatomaceous earth, adherent to and protected by a relatively refractory ceramic coating, having excellent thermal shock resistance and meeting the strength and electronic design requirements, would be suitable for such applications. The adhesive would, of course, be a minimum amount of a high temperature resistance cement, for example, a sodium-poor grade of sodium silicate, or silicic acid itself.

There is no presently known published formulation that meets all the requirements of a ceramic radome. Some ceramic bodies, especially those used in the electrical porcelain and spark plug industries have many of the necessary requirements, but have some undesirable property that makes them unsuitable for use on radome structures. Among the unusual requirements that the outer surface of a radome must meet are, besides high mechanical strength, transparency to the shortwave electrical radiation employed in radar and the ability to retain both of these properties at a temperature of approximately 500° Fahrenheit. It is not generally known that the skins of guided missiles attain such temperatures, but nevertheless, it is true, since the modern ones attain speeds in air well in excess of 1000 miles per hour.

The usual fabrication method in producing the strongest ceramic parts is to employ pressure either by extrusion or by pressing the desired shaped objects. If the object is very large and the shape is not adaptable to extrusion, pressing may also be impractical. In this application, the size and shape of the radomes almost necessitates fabrication by a casting or a combination of casting and jiggering operation. When many of the formulations with reported high strengths are cast, instead of pressed or extruded, the strength drops off considerably.

This invention deals with formulations having modulus of rupture values in excess of 18,000 p. s. i. for cast specimens and approximately 26,000 p. s. i. for extruded specimens. Test specimens were ⅝" diameter rods x 7" long machined from cast and extruded stock. They have electrical properties approximating those of high voltage porcelains, and exhibit excellent thermal shock properties. It is the object of this invention to provide a composition giving such properties when fired.

The formulation of a castable, high strength, thermal shock body, adaptable for a radome sandwich skin may have a basic structural crystal, as alumina, a suitable flux, as manganese dioxide; a suspending agent, as ball clay; and an auxiliary flux, as whiting. Such a body composition is developed with the specific purpose of substantially eliminating the glassy phase. Additional green strength is produced by use of an additional binder such as polyvinyl alcohol and an adsorptive material such as diatomaceous earth, to inhibit binder mgiration.

A body of the type described above might contain, but is not limited to the following materials in the proportions shown:

| | |
|---|---|
| Tennessee #1 SGP ball clay (air floated) | 20% |
| Whiting (O. Hommel—technical grade) (CaCO₃+small proportions of silica and iron) | 22% |
| Alumina (powdered) | 50% |
| Manganese dioxide (Foote mineral—air floated) | 8% |
| Diatomaceous earth (Celite—micropulverized) | 1% (dry basis) |
| Polyvinyl alcohol (Dupont—low viscosity #51-05) | 1% (dry basis) |
| n-Amyl alcohol (Eimer and Amend C. P.) | 0.64 cc./lb. (dry basis) |
| "N" Brand sodium silicate | 9.0 cc./lb. (dry basis) |
| Water | 38.8% (dry basis) |

The brands used are mentioned merely to indicate ones which have been found to be satisfactory. The invention is not restricted to the use of any particular brands.

This formulation, with slight variations in binders and water content, may be fabricated by any of the various methods employed in the ceramic industries. The materials are thoroughly dispersed by blunging or by a similar process, the method depending somewhat on the type of fabrication employed. The above formulation matures at cone 13. It may be fired on an 18 hour cycle with no-soaking period if desired. X-ray data indicates that the recommended formulation, when fired to cone 13, is largely corundum, with minor amounts of manganese aluminate. A calcium aluminum silicate, possibly gehlenite, and manganese orthosilicate, also crystallize and are to be found distributed throughout the fired mass.

A petrographic examination indicates that some of the manganese enters into solid solution with the alumina and that a portion of the manganese oxide occurs as unreacted or partially-converted clusters of black needles. Bladed crystals of the gehlenite, mentioned above, are intermixed with the rounded, triangular or rhombic corundum grains. The corundum with manganese in solid solution, forms the basic-structure crystal. The manganese is necessary in fluxing the alumina. If the manganese dioxide content is lowered to 4% by weight, the necessary maturing temperature is increased and the body must be fired to cone 20. Again, if the percentage is increased to 37% by weight, keeping the other weight ratios constant, the body is mature at cone 4 or 5.

The particle size of the alumina must be controlled quite closely in maintaining high strengths. The alumina particles more or less control both the green and fired physical properties (i. e., cracking, warping, etc.). Best results are obtained if the alumina content is:

85%—95% less than 10 microns diameter
65%—85% less than 5 microns diameter
Not more than 10%—30% less than 2 microns diameter The tolerances are due to the inexactness of the measuring and counting methods employed. The percentages of particles close to 5 microns are most critical in that they control the drying characteristics (by elimination of drying cracks and the reduction of warpage) and are necessary in promoting high strengths.

The size of the particles above 10 microns may vary considerably, but the proportion of particles below that size must be rigidly controlled because a casting slip becomes thixotropic and difficult to handle if there is an excess of fines below 2 microns. Ball clay is incorporated as a suspending agent for the non-plastics, and to promote green strength. It also acts as an auxiliary flux. Tennessee #1 SGP is recommended for its suspending power, high green strength, low iron content, and because it does not cause warpage in this formulation. An alkaline earth such as whiting may be employed as an additional flux. It reacts with the clay, forming an alkaline earth aluminum silicate (with the recommended formulation, the crystalline phase is believed to be gehlenite). By reacting with the silica, the formation of a glassy phase is somewhat reduced and the additional crystalline phase may be used to alter slightly the electrical properties.

If additional green strength is required, an organic binder is recommended in preference to increasing the clay content. Additional clay decreases the fired strength, possibly by introducing additional glass (the effect on the electrical properties as a result of an increase in the clay content was not investigated). Of the various binders that may be used, a 1% addition of polyvinyl alcohol (Dupont low viscosity #51-05) added as a 5 parts by weight water, to 1 part by weight polyvinyl alcohol solution is recommended for a casting slip. Waxes are not desirable because of their mold-clogging tendencies. Other methods of fabrication may require different binders. Water soluble binders employed to increase the green strength of cast ware tend to migrate into the mold with the water, and, if nothing is added to reduce the migration, a hard shell is formed at the interface of the ware and the mold. This leaves the interior quite weak and the strength of the binder is greatly reduced. Small percentages of materials exhibiting adsorbent characteristics, such as finely ground diatomaceous earth, may be added to reduce such migration. A large portion of the binder is adsorbed on the surface of the particles and retained within the piece after the water leaves. These small additions also help to increase the mold life by keeping the binders from entering the mold and reducing its absorptive property.

The n-amyl alcohol reduces the surface tension of the polyvinyl alcohol and by so doing, helps eliminate small bubbles in the slip. The voids resulting from the bubbles reduces the fired strength and alters the electrical properties somewhat. The following list includes the physical and electrical properties of cast specimens of the recommended formulation, fired to cone 13 on an 18 hour cycle in a neutral to slightly reducing atmosphere:

```
Adsorption (H2O)_____ 0.010%
Mohs hardness_____ Approx. 9
Coeff. of linear expansion:
    20° C.-100° C_____ 6.19×10⁻⁶ in./in./°C.
    20° C.-500° C_____ 7.5×10⁻⁶ in./in./°C.
    20° C.-1000° C_____ 8.0×10⁻⁶ in./in./°C.
Tensile strength:
    20° C_____ 9,400 p. s. i.
    400° C_____ 5,750 p. s. i.
    500° C_____ 5,600 p. s. i.
Compressive strength (5/8" dia. 5/8" long
    slugs) _____ 87,000 p. s. i.
Modulus of rupture (5/8" dia. 5" span)__ 18,500 p. s. i.
Impact strength (Charpy—5/8" dia.)___ 1.98 ft. lb./sq. in.
Thermal shock resistance_____ No failure
Power factor at 1 mc. (20° C.)_____ 0.016 (dry)
Dielectric constant at 1 mc. (20° C.)_____ 8 (dry)
Dielectric constant at 10,000 mc. (20° C.)_____ 7.56
Dielectric constant at 10,000 mc. (100° C.)_____ 7.58
Dielectric constant at 10,000 mc. (200° C.)_____ 7.62
Dielectric constant at 10,000 mc. (300° C.)_____ 7.64
Dielectric constant at 10,000 mc. (400° C.)_____ 7.64
Dielectric constant at 10,000 mc. (500° C.)_____ 7.68
```

It is evident from the foregoing that invention exists in the method of treating the material of the disclosed range of ingredients, since the best results are not obtainable except by following the method steps recommended.

What I claim is:

1. A solid ceramic object, said object being the product of pressing a ceramic batch of the following composition:

Ball clay_____ 20%
Whiting _____ 22%
Powdered alumina_____ 50%
Manganese dioxide_____ 8%
Diatomaceous earth____ 1% (dry basis)
Polyvinyl alcohol_____ 1% (dry basis)
n-Amyl alcohol_____ 0.64 cc./lb. (dry basis)
Sodium silicate_____ 9.0 cc./lb. (dry basis)
Water sufficient to make the dry batch up to the desired plasticity, said pressed batch having been fired to maturity and comprised largely of corundum with minor amounts of manganese aluminate, calcium aluminum silicate and manganese orthosilicate distributed throughout the corundum, said body being substantially transparent to the electrical radiation of short wave length customarily employed for radar.

2. A cast ceramic body made from a ceramic batch having the composition:

| | |
|---|---|
| Ball clay | 20% |
| Whiting | 22% |
| Powdered alumina | 50% |
| Manganese dioxide | 8% |
| Diatomaceous earth | 1% (dry basis) |
| Polyvinyl alcohol | 1% (dry basis) |
| n-Amyl alcohol | 0.64 cc./lb. (dry basis) |
| Sodium silicate | 9.0 cc./lb. (dry basis) |

Water sufficient to make the dry batch up to the desired plasticity, said body having been fired to about cone 13 for approximately 18 hours and consisting largely, after firing, of corundum, with minor amounts of manganese aluminate, calcium aluminum silicate and manganese orthosilicate, said body having substantially the following physical properties:

| | |
|---|---|
| Adsorption ($H_2O$) | 0.010% |
| Mohs hardness | Approx. 9 |
| Coeff. of linear expansion: | |
| 20° C.–100° C. | $6.19 \times 10^{-6}$ in./in./°C. |
| 20° C.–500° C. | $7.5 \times 10^{-6}$ in./in./°C. |
| 20° C.–1000° C. | $8.0 \times 10^{-6}$ in./in./°C. |
| Tensile strength: | |
| 20° C. | 9,400 p. s. i. |
| 400° C. | 5,750 p. s. i. |
| 500° C. | 5,600 p. s. i. |
| Compressive strength (⅜″ dia. ⅜″ long slugs) | 87,000 p. s. i. |
| Modulus of rupture (⅝″ dia. 5″ span) | 18,500 p. s. i. |
| Impact strength (Charpy—⅝″ dia.) | 1.98 ft. lb./sq. in. |
| Thermal shock resistance | No failure |
| Power factor at 1 mc. (20° C.) | 0.016 (dry) |
| Dielectric constant at 1 mc. (20° C.) | 8 (dry) |
| Dielectric constant at 10,000 mc. (20° C.) | 7.56 |
| Dielectric constant at 10,000 mc. (100° C.) | 7.58 |
| Dielectric constant at 10,000 mc. (200° C.) | 7.62 |
| Dielectric constant at 10,000 mc. (300° C.) | 7.64 |
| Dielectric constant at 10,000 mc. (400° C.) | 7.64 |
| Dielectric constant at 10,000 mc. (500° C.) | 7.68 |

3. A cast ceramic body made from the batch set forth in the above claim, the alumina in said batch having such a particle size distribution so that 85% to 95% measures less than 10 microns, 65% to 85% measures less than 5 microns and not more than 10% to 30% measures less than 2 microns in diameter, the percentages being taken by weight.

HARRY C. DUNEGAN.

REFERENCES CITED

The following references are of record in the file of this patent:

UNITED STATES PATENTS

| Number | Name | Date |
|---|---|---|
| 1,966,408 | Nauman | July 10, 1934 |
| 2,124,865 | Winkler et al. | July 26, 1938 |
| 2,327,972 | Stettinius et al. | Aug. 24, 1943 |
| 2,330,129 | Lucas et al. | Sept. 21, 1943 |
| 2,423,958 | Austin et al. | July 15, 1947 |
| 2,482,580 | Feichter | Sept. 20, 1949 |
| 2,502,198 | Benner et al. | Mar. 28, 1950 |